United States Patent
Kunszt et al.

(10) Patent No.: US 9,528,025 B2
(45) Date of Patent: Dec. 27, 2016

(54) PIGMENTED COATING AGENT AND METHOD FOR PRODUCING A MULTILAYER COATING USING THE PIGMENTED COATING AGENT FOR PRODUCING A PANE ADHESION

(71) Applicant: BASF Coatings GmbH, Muenster (DE)

(72) Inventors: Carmen Kunszt, Hammelburg (DE); Norbert Loew, a.d. Aisch (DE); Thomas Farwick, Billerbeck (DE); Bjoern Feldmann, Muenster (DE)

(73) Assignee: BASF Coatings GmbH, Muenster (DE)

( * ) Notice: Subject to any disclaimer, the term of this patent is extended or adjusted under 35 U.S.C. 154(b) by 0 days.

(21) Appl. No.: 14/898,772

(22) PCT Filed: May 20, 2014

(86) PCT No.: PCT/EP2014/060304
§ 371 (c)(1),
(2) Date: Dec. 16, 2015

(87) PCT Pub. No.: WO2014/202313
PCT Pub. Date: Dec. 24, 2014

(65) Prior Publication Data
US 2016/0137876 A1    May 19, 2016

(30) Foreign Application Priority Data

Jun. 21, 2013  (EP) .................... 13173147

(51) Int. Cl.
| | | |
|---|---|---|
| *C09D 161/28* | (2006.01) | |
| *B32B 17/00* | (2006.01) | |
| *C09J 5/00* | (2006.01) | |
| *C09D 183/12* | (2006.01) | |
| *B32B 37/12* | (2006.01) | |
| *C09D 5/00* | (2006.01) | |
| *C09D 7/12* | (2006.01) | |
| *C09J 5/02* | (2006.01) | |
| *C08G 77/46* | (2006.01) | |
| *B05D 7/00* | (2006.01) | |
| *B60J 10/00* | (2016.01) | |

(52) U.S. Cl.
CPC ............. *C09D 161/28* (2013.01); *B32B 17/00* (2013.01); *B32B 37/12* (2013.01); *C09D 5/00* (2013.01); *C09D 7/125* (2013.01); *C09D 7/1233* (2013.01); *C09D 7/1291* (2013.01); *C09D 183/12* (2013.01); *C09J 5/00* (2013.01); *C09J 5/02* (2013.01); *B05D 7/532* (2013.01); *B05D 2201/00* (2013.01); *B05D 2202/00* (2013.01); *B32B 2255/26* (2013.01); *B60J 10/00* (2013.01); *C08G 77/46* (2013.01)

(58) Field of Classification Search
CPC .............................. C09D 161/28; C09D 5/00
See application file for complete search history.

(56) References Cited

U.S. PATENT DOCUMENTS

| | | | |
|---|---|---|---|
| 2003/0232222 A1 | 12/2003 | Anderson et al. | |
| 2012/0045632 A1* | 2/2012 | Low ................. | B32B 17/10036 428/216 |

FOREIGN PATENT DOCUMENTS

| | | |
|---|---|---|
| DE | 10 248 799 A1 | 5/2004 |
| WO | WO-01/07528 A1 | 2/2001 |
| WO | WO-2005/046889 A1 | 5/2005 |
| WO | WO-2005/105938 A1 | 11/2005 |
| WO | WO-2006/063304 A1 | 6/2006 |
| WO | WO-2007/008635 A1 | 1/2007 |
| WO | WO-2008/021712 A2 | 2/2008 |
| WO | WO-2008/100548 A1 | 8/2008 |
| WO | WO-2010/121794 A2 | 10/2010 |

OTHER PUBLICATIONS

International Search Report for International Patent Application No. PCT/EP2014/060304, dated Oct. 29, 2014.

* cited by examiner

*Primary Examiner* — Kuo-Liang Peng
(74) *Attorney, Agent, or Firm* — Marshall, Gerstein & Borun LLP

(57) ABSTRACT

The present invention relates to a solvent-based, pigmented coating composition having a solids content of at least 35%, comprising
(A) at least one melamine resin,
(B) at least one pigment,
(C) at least one organic solvent, and
(D) at least one organosiloxane of the general formula (I)

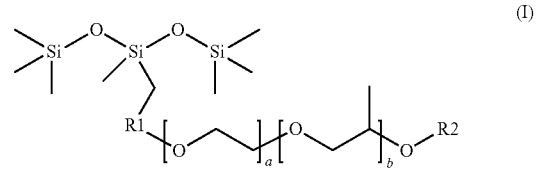

where $R_1=C_nH_{2n}$ with n=1 to 3; $R_2$=H or $C_mH_{2m+1}$ with m=1 to 4; a=0 to 20; b=0 to 20; and a+b=2 to 40. The present invention further relates to a process for producing a multicoat coating system, using the coating composition, and to the use of the multicoat coating system for adhesively bonding glazing sheets.

16 Claims, No Drawings

PIGMENTED COATING AGENT AND METHOD FOR PRODUCING A MULTILAYER COATING USING THE PIGMENTED COATING AGENT FOR PRODUCING A PANE ADHESION

CROSS-REFERENCE TO RELATED APPLICATIONS

This is the U.S. national phase of International Application No. PCT/EP2014/060304, filed May 20, 2014, which claims the benefit of European Patent application No. 13173147.3, filed Jun. 21, 2013.

FIELD OF THE INVENTION

The present invention relates to a solvent-based, pigmented coating composition comprising a special modified organosiloxane. The present invention also relates to a process for producing a multicoat coating system using the solvent-based, pigmented coating composition. The present invention further relates to the use of the solvent-based, pigmented coating composition and of the multicoat coating system for improving the sheet bonding adhesion of glazing sheets.

PRIOR ART

The known solvent-based, pigmented coating compositions, more particularly those known as basecoat materials, are used in the automobile industry, for example, for producing single-coat or multicoat color and/or effect paint systems. Multicoat paint systems in which, as is known, a clearcoat material is applied over the basecoat film, in particular, have good performance properties.

The continually growing technical and esthetic requirements of the market, especially the requirements of the automakers and their customers, however, are necessitating continual ongoing development of the technical and esthetic levels hitherto achieved.

In particular it is necessary to provide new coating compositions which have a lower VOC (volatile organic content) as compared with the prior art, so that fewer VOC emissions occur in the production of such multicoat paint systems and so, therefore, that production can be made more in tune with the environment. A particular way in which the VOC can be lowered is by increasing the solids content of the coating compositions in question.

Nowadays, for example, in the production of multicoat paint systems as part of the known wet-on-wet method (in which, for example, following initial application of a pigmented basecoat material and a brief flash-off time of this coating material, without a baking step, a clearcoat material is applied over it and only then are the paint films jointly baked), the switch from medium-solids basecoat systems, with a solids fraction between 20-30%, to high-solids basecoat systems, with a solids fraction greater than 35% in the application-ready state (spray viscosity), is achieving a significant VOC reduction in the processing operation. Similar achievements are being made with the use of high-solids clearcoats (clearcoat materials with a high solids content of up to 45% or more at spray viscosity). Increasing the solids content by only about 3% to 5% in the context of industrial painting operations is enough on its own to achieve massive savings in terms of organic solvents, which must absolutely be used and which are therefore emitted to the environment on processing.

Besides the aspect of environmental compliance, however, it is of central importance that at the same time other technological properties, and also the esthetic properties, of coating compositions and of multicoat paint systems produced from them are retained, if not indeed improved. These properties include, for example, the scratch resistance, chemical resistance, and weather resistance, but also, in particular, good leveling of the coating compositions and—as a result of factors including said good leveling—the high-grade aspect and very good overall appearance of the multicoat paint systems.

The pigmented coating compositions, more particularly basecoat materials, employed in the production of such multicoat paint systems generally comprise a polymerizable binder and a crosslinker. This polymerizable binder, for example, possesses hydroxy-functional groups on a polymeric scaffold. Crosslinkers employed are frequently melamine resins, examples being monomeric crosslinking resins such as hexa(methoxy-methyl)melamine (HMMM) or melamines with mixed etherification. Likewise employed as crosslinkers, for example, are free or blocked polyisocyanates. The clearcoat materials used in the production process are based predominantly on carbamate-containing binder systems, which are able, in combination with monomeric crosslinking resins such as hexa(methoxymethyl)melamine (HMMM) or melamines with mixed etherification, and optionally with further polymerizable binders, to form a dense network.

Through the use of the coating compositions described, more particularly basecoat and clearcoat materials, success is achieved in uniting a high solids content (low VOC) with the technological advantages the customer requires, such as very good overall appearance of the resultant multicoat paint system.

A problem, however, is that the adhesion of adhesives applied to such multicoat paint systems, in order, for example, to bond windshields, frequently fails to meet the requirements. The bond boundary between multicoat paint system, especially the clearcoat, and the glazing sheet constitutes a distinct weak point in the overall construction. While the adhesion/bonding between glazing sheet and layer of adhesive causes no problems or is very good as a result of use of typical adhesive materials, the adhesion between the clearcoat film and the layer of adhesive, in particular, is the critical weak point in the overall construction.

Windshields are typically bonded using a moisture-curing adhesive material based on polymers containing isocyanate groups to a vehicle body coated with a multicoat paint system. Motor Vehicle Safety Standards (MVSS) require this adhesive to exhibit complete adhesion to the windshield and to the multicoat paint system. The skilled person is aware that multicoat paint systems, especially those as described above, based on carbamate and melamine, which otherwise possess good technological properties and optical properties, display a distinct weakness with regard to sheet bonding adhesion. In the automobile industry, therefore, it is very largely still the case that a primer is applied to the multicoat paint system before the adhesive is applied. The use of an additional primer of this kind between multicoat paint system and adhesive entails considerable extra costs in view of the additional material and time consumed.

The adhesive can also be applied directly to the multicoat paint system without using a primer interlayer between multicoat paint system and adhesive (primerless process). The primerless process is nowadays increasingly being used in the automobile segment; however, precise operational monitoring, such as extremely precise checking of the film thicknesses of basecoat and clearcoat, and of the baking times and baking temperatures, for example, is required. Even such precise operational monitoring cannot always ensure that the adhesives adhere adequately to the multicoat paint systems. In cases of excessively high basecoat film thicknesses combined with low clearcoat film thicknesses, in particular, there may be unwanted disbonding of the sheet bonding material from the multicoat paint system. Thus, for example, while it is known that the melamine resins present in the basecoat materials described do contribute to a good overall appearance on the part of the multicoat paint system, they nevertheless lead on an inter-film basis to unwanted interactions with the adhesives employed for sheet bonding, resulting in inadequate adhesion. This applies especially to the moisture-curing, isocyanate-based adhesives which are typically employed on the basis of their otherwise excellent profile of properties for sheet bonding. Through a significant reduction in the melamine resin fraction or the omission of these melamine resins from the basecoat material, this disruptive effect can certainly be reduced. However, such formulations exhibit impaired appearance and can be produced in some cases also only with a markedly reduced solids fraction.

In some cases an attempt is made to optimize the sheet bonding adhesion to multicoat paint systems by means of modifications in the clearcoat and/or basecoat materials.

WO 2008/021712 A2 describes the use of an adhesion additive based on boric acid or a boric acid derivative and an ester in the production of multicoat paint systems. The use of this additive in a carbamate-melamine clearcoat material results in an improvement in the sheet bonding adhesion.

U.S. 2003/232222 A1 likewise describes the use of an additive based on boric acid or a boric acid derivative and an ester in one or both coats of the multicoat paint system, in order thus to improve the intercoat adhesion and/or the sheet bonding adhesion.

WO 2007/008635 A1 describes a multicoat paint system in which a basecoat and/or clearcoat material is used that comprises a special additive. The additive contains functional groups which react little, if at all, with the polymeric binders or the crosslinker in the paint. This additive accumulates in the interface region at the surface of the paint system, or at the inter-boundary layer between basecoat and clearcoat materials, and causes the sheet bonding adhesion or the intercoat adhesion to improve. Suitable additives described are (meth)acrylate ester-based or alpha-olefin-based polymers. The addition of the additive also leads to advantages in terms of the leveling and the wetting, enabling wetting agents and leveling additives to be absented from the clearcoat. The additive is used in the clearcoat to improve the sheet bonding adhesion.

WO 2006/063304 A1 describes the use of an additive based on a hydroxyl-functional epoxy polymer for the purpose of enhancing the intercoat adhesion or sheet bonding adhesion. The additive is used in the clearcoat for the purpose of improving the sheet bonding adhesion. The additive reacts only limitedly with the functional groups in the clearcoat material, and accumulates in the interface region at the surface of the paint system, thereby enabling an improvement in the sheet bonding adhesion.

WO 2008/100548 A1 describes a clearcoat material based on a carbamate-functional polymer and on a melamine resin. For the purpose of optimizing the sheet bonding adhesion, both the clearcoat and the basecoat use an adhesion promoter based on dibutyltin diacetate and butylphosphoric acid.

WO 2005/105938 A1 describes a clearcoat based on an OH polyester and on a polyisocyanate crosslinker. Silane-containing components of low molecular mass are used in the clearcoat material in the aim, among others, of optimizing the sheet bonding adhesion.

WO 2005/046889 A1 describes a multicoat paint system where not only the clearcoat material but also the sheet bonding adhesive applied thereto contain silane groups. When the customary alkyl- or aryl-phosphoric acid catalysts are employed in the basecoat material, however, the advantageous effect of such silane components is oftentimes greatly impaired. The use of a strong acid catalyst substitutewise in the basecoat material is said to impair the activity of the silane component to less of an extent. The use of epoxy-isocyanate-blocked catalysts is preferred, since they result in a better appearance as compared with amine-blocked catalysts.

WO 2010/121794 A2 describes the use of a polyester binder having a hydroxyl number of at least 240 mg KOH/g and an acid number of not more than 10 mg KOH/g in a melamine resin-based basecoat material for the purpose of enhancing the sheet bonding adhesion of multicoat paint systems.

In spite of the various approaches to achieving good sheet bonding adhesion by modification of basecoat and/or clearcoat materials in multicoat paint systems, there continues to be a need for further optimization in order to meet the rising requirements in the various industrial sectors, especially in the segment of the automobile industry. Especially in multicoat systems in which melamine resin-based, pigmented coating materials with high solids contents are employed as basecoat materials, the marrying of good performance properties, more particularly a good appearance, to satisfactory sheet bonding adhesion represents a major challenge.

There was therefore a need for development of a pigmented coating composition which when used in multicoat paint systems, especially in those in which a clearcoat material is applied to the pigmented coating composition, lead to outstanding appearance and at the same time to very good sheet bonding adhesion. Moreover, further technological properties of the coating composition, such as a high solids content at spray viscosity, in particular, ought to continue to be retained unchanged, or even to be improved.

Problem

The problem addressed by the present invention, accordingly, was that of providing a solvent-based, pigmented coating composition which when used for producing multicoat paint systems not only leads to outstanding performance properties on the part of the multicoat paint system, and especially to a good appearance, but also, at the same time, allows good sheet bonding adhesion. The intention was therefore to avoid the drawbacks of known coating compositions, which when used for producing multicoat paint systems regularly combine the attainment of good appearance with an inadequate sheet bonding adhesion, or an adequate sheet bonding with an impaired appearance. Furthermore, the system thus modified ought additionally to be able to be united with a high solids content—in other words, the solvent-based, pigmented coating composition ought to have a low VOC content desired for environmental reasons.

Solution

It has been found that the problem stated above is solved by means of a solvent-based, pigmented coating composition having a solids content of at least 35%, comprising (A) at least one melamine resin,
(B) at least one pigment,
(C) at least one organic solvent, and
(D) at least one organosiloxane of the general formula (I)

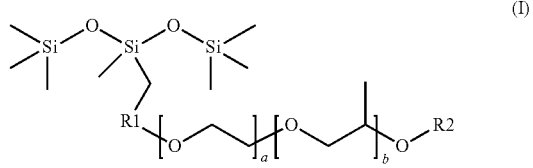
(I)

where $R_1 = C_nH_{2n}$ with n=1 to 3; $R_2$=H or $C_mH_{2m+1}$ with m=1 to 4; a=0 to 20; b=0 to 20; and a+b=2 to 40.

Coating compositions with a solids fraction of 35% or more are termed high-solids coating compositions. Accordingly the solvent-based, pigmented coating composition is a high-solids coating composition.

The aforementioned coating composition is also identified below as the coating composition of the invention and, accordingly, is subject matter of the present invention. Preferred embodiments of the coating composition of the invention can be found in the description which follows below and also in the dependent claims.

Also subject matter of the present invention is a process for producing a multicoat paint system, in which
(1) at least one basecoat material is applied to a substrate,
(2) a polymer film is formed from the basecoat material applied in stage (1),
(3) at least one clearcoat material is applied to the resultant basecoat film, and subsequently
(4) the basecoat film is cured together with the clearcoat material applied in stage (3),
which comprises using as basecoat material a coating composition of the invention, and with the topmost coat of the multicoat paint system being a clearcoat film.

Additionally subject matter of the present invention is a multicoat paint system produced by the process of the invention.

Likewise subject matter of the present invention is a process for producing a multicoat coating system, in which
(1) a multicoat paint system of the invention is produced and
(2) an adhesive is applied directly to the topmost clearcoat film of the multicoat paint system, forming a layer of adhesive.

Subject matter of the present invention is also a multicoat coating system produced by said process for producing a multicoat coating system.

A substrate coated with a multicoat coating system of the invention is also subject matter of the present invention.

A further aspect of the invention is the use of the multicoat coating system of the invention for adhesively bonding glazing sheets on a substrate coated with the multicoat coating system, where
(1) a multicoat paint system of the invention is produced,
(2) an adhesive is applied directly to the topmost clearcoat film of the multicoat paint system, forming a layer of adhesive on the multicoat paint system and hence forming a multicoat coating system of the invention, and
(3) a glazing sheet is applied to the layer of adhesive and then the adhesive is cured.

Also, accordingly, the use of the coating composition of the invention for improving sheet bonding adhesion is subject matter of the present invention.

It follows from the above that for the purposes of the present invention, for reasons not least of clarity, the multicoat paint system coated with a layer of adhesive is referred to as the multicoat coating system.

In particular it has been found that the coating composition of the invention no longer has the disadvantages of the known solvent-based, pigmented coating compositions based on melamine, but instead, in contrast, when used for producing multicoat paint systems, leads simultaneously to a good appearance and to outstanding sheet bonding adhesion. The stated properties are therefore united. In addition, the coating composition of the invention has a high solids content and is therefore very advantageous not only from performance standpoints but also from environmental standpoints. A particular surprise was that by combining melamine resins with the specific organosiloxanes of the formula (I) in solvent-based, pigmented coating compositions, it was possible to achieve the stated advantages, more particularly the improvement of the sheet bonding adhesion to the clearcoat film of the multicoat paint system.

DETAILED DESCRIPTION OF THE INVENTION

The Multicoat Paint System of the Invention and Processes for its Production

The construction of the multicoat paint systems of the invention is preferably such that first of all a primer has been applied to a substrate. Located above the primer, preferably, is at least one coat of a primer surfacer and also at least one coat of a basecoat material, over which at least one coat of a clearcoat material is located, with a clearcoat or clearcoat film representing the uppermost coat of the multicoat paint system. Of the stated coating compositions, preferably precisely one is employed. The basecoat here is produced by using the coating composition of the invention—in other words, the coating composition of the invention is preferably a basecoat material.

The coat system identified above is the coat system commonly employed in the automotive finishing segment. The multicoat paint system of the invention, accordingly, is preferably a multicoat automotive paint system.

It follows from what has been said above that in the context of the process of the invention a primer and also a surfacer are applied preferably before the basecoat material is applied. As described later on below, the primer and the surfacer are preferably each cured separately before the basecoat material is applied. In the context of the process of the invention, the coating composition of the invention is employed in each case as a basecoat material. However, it is also possible for it to be used additionally, for example, as a surfacer.

The substrates are typically provided with a primer, in the form for example of an electrocoat, more particularly a cathodic electrocoat. This coat is applied by the customary methods such as electrodeposition coating, dipping, knife-coating, spraying, rolling, or the like. The primer is preferably cured at least partly or completely, more particularly completely, before surfacer, basecoat, and clearcoat materials are applied. The primer is cured typically by heating to a temperature between 80 and 170° C. for a time of 3 to 30 minutes.

The multicoat paint system of the invention is produced preferably on substrates made of metal and/or plastic, preferably of metal. These substrates may of course have been conversion-coated or otherwise pretreated. For instance, metallic substrates are generally conversion-coated, more particularly phosphated.

Applied atop the primer is then at least one surfacer, at least one basecoat material, and at least one clearcoat material—preferably in each case precisely one of the stated materials.

Surfacer, basecoat, and clearcoat materials are applied by means of conventional methods of applying liquid coating compositions, such as, for example, dipping, knifecoating, spraying, rolling, or the like, but more particularly by means of spraying. Preference is given to employing spray application techniques, such as, for example, compressed air spraying, airless spraying, high-speed rotation, electrostatic spray application (ESTA), optionally in conjunction with hot spray application such as hot air spraying, for example. It is particularly advantageous to apply a basecoat material by ESTA in a first application and pneumatically in a second application.

The surfacer is preferably cured at least partly or completely, preferably completely, before basecoat and clearcoat materials are applied. Curing of the surfacer takes place conventionally by heating to a temperature between 80 and 170° C. for a time of 3 to 30 minutes. The applied basecoat material is preferably flashed off briefly or dried briefly, generally at a temperature between 20 and less than 100° C. for a time of 1 to 15 minutes. Thereafter the clearcoat material is applied.

The applied basecoat material and the applied clearcoat material are thermally cured preferably jointly. Where the clearcoat material, for example, is also curable with actinic radiation, there is a subsequent aftercure by exposure to actinic radiation.

Curing may take place after a certain rest time. It may have a duration of 30 seconds to 2 hours, preferably 1 minute to 1 hour, and more particularly 1 to 45 minutes. The rest time serves, for example, for leveling and for degassing of the coating films, or for the evaporation of volatile constituents. The rest time may be shortened and/or assisted by the use of elevated temperatures of up to 90° C. and/or by a reduced atmospheric humidity of less than 10 g water/kg air, provided this does not entail any damage or alteration to the coating films, such as premature crosslinking, for instance.

Curing takes place typically at a temperature between 90 and 160° C. for a time of 5 to 90 minutes.

The stated temperatures should be understood in each case to be the actual temperatures of the coated substrate.

For the drying and/or conditioning of the wet basecoat and of the wet clearcoat it is preferred to use thermal and/or convection methods, employing customary and known apparatus such as tunnel ovens, radiant NIR and IR heaters, blowers, and blowing tunnels. These forms of apparatus may also be combined with one another.

In the multicoat paint systems of the invention, the basecoat generally has a dry film thickness of preferably 3 to 40 micrometers, more preferably of 5 to 30 micrometers, and very preferably 7 to 25 micrometers. The clearcoat may in general have a dry film thickness of preferably 10 to 60 micrometers, more preferably up to 55 micrometers, more particularly up to 45 micrometers, and very preferably up to 40 micrometers. Particularly preferred are ranges from 25 to 55 micrometers, more particularly from 30 to 45 micrometers, and especially advantageously from 35 to 40 micrometers.

The primers, surfacers, and clearcoat materials that are used may be the coating materials known to the skilled person in this context and available commercially in general. The clearcoat materials are preferably solvent-based clearcoat materials, possessing a solids fraction of preferably at least 45% (at spray viscosity). Such clearcoats are also referred to in the context of the invention as high-solids clearcoats. Preferred clearcoats are described in detail later on below.

In the process of the invention, then, it is preferred to use precisely one basecoat material (coating composition of the invention) and precisely one clearcoat material. Both coating films are jointly cured (wet-on-wet process).

The Coating Composition of the Invention

Melamine Resin (A)

The coating composition of the invention comprises at least one melamine resin (A). Melamine resins are polycondensation resins formed from melamine (1,3,5-triazine-2,4,6-triamine) and a maximum of 6 mol of formaldehyde per mole of melamine. The resultant methylol groups may have been wholly or partly etherified with one or different alcohols. Melamine resins may have different degrees of methylolation and different degrees of etherification.

The degree of methylolation of a melamine resin describes how many of the possible methylolation sites on the melamine have been methylolated, i.e., how many of the total of six hydrogen atoms of the primary amino groups in the melamine (i.e., of the 1,3,5-triazine-2,4,6-triamine) have been replaced by a methylol group. A fully methylolated monocyclic melamine resin, accordingly, has six methylol groups per triazine ring, such as hexamethylolmelamine, for example. The methylol groups may independently of one another also be present in etherified form.

The degree of etherification of a melamine resin is understood to be the fraction of methylol groups in the melamine resin that have been etherified with an alcohol. In the case of a fully etherified melamine resin, all of the methylol groups present are not free, but are etherified with an alcohol. Monohydric or polyhydric alcohols are suitable for the etherification. Preference is given to using monohydric alcohols for the etherification. For example, methanol, ethanol, n-butanol, isobutanol, or else hexanol may be used for the etherification. It is also possible to use mixtures of different alcohols, such as a mixture of methanol and n-butanol, for example.

Melamine resins may be present in monomeric (monocyclic) or oligomeric (polycyclic) form. The epithet "monocyclic" or "polycyclic" refers to the number of triazine rings per molecule of melamine resin. One example of a monocyclic, fully methylolated, and fully butanol-etherified melamine resin is hexamethoxybutylmelamine.

Aminoplast resins employed are the aminoplast resins typically employed in the paint industry sector. Preferred resins are methanol-etherified and/or butanol-etherified melamine-formaldehyde resins, examples being the products available commercially under the names Cymel®, Resimene®, Maprenal®, and Luwipal®, more particularly Resimene® 747 and Resimene® 755, for use.

The amount of melamine resins in the coating composition of the invention is preferably 8% to 30% by weight, more preferably 10% to 28% by weight, most preferably 13% to 26% by weight, and, in one very advantageous embodiment, 15% to 24% by weight, based in each case on the total weight of the basecoat material. A very good appearance is achieved more particularly through the use of melamine resin fractions of at least 10% by weight, preferably at least 13% by weight, very preferably at least 15% by weight. Through the combination of these comparatively high melamine resin fractions with the further constituents of the coating composition of the invention, more particularly the modified organosiloxanes (D), the sheet bonding adhesion achieved is surprisingly then nevertheless good.

Pigment (B)

The coating composition of the invention is pigmented and so comprises at least one pigment. Pigments, as is known, are colorants in powder and/or platelet form that are commonly used in coating compositions.

The pigment is preferably selected from the group consisting of organic and inorganic, preferably inorganic, color-imparting, effect-imparting, color- and effect-imparting, magnetically shielding, electrically conductive, corrosion-inhibiting, fluorescent, and phosphorescent pigments. Preference is given to using the color- and/or effect-imparting pigments (color and/or effect pigments).

With particular preference the pigmented coating composition of the invention comprises at least one effect pigment, preferably at least one metal flake pigment. In addition to the effect pigment or pigments, the pigmented coating composition of the invention may also further comprise at least one or more additional pigments, examples being color pigments.

Examples of suitable effect pigments, which may also impart color, are metal flake pigments, more particularly aluminum flake pigments, such as commercial stainless steel bronzes, more particularly commercial aluminum bronzes, and also nonmetallic effect pigments, such as, for example, pearlescent pigments and interference pigments, platelet-shaped effect pigments based on iron oxide, or liquid-crystalline effect pigments. For further details refer to Römpp Lexikon Lacke and Druckfarben, page 176, entry heading "Effektpigmente" [Effect pigments] and pages 380 and 381, entry headings "Metalloxid-Glimmer-Pigmente" [Metal oxide-mica pigments] to "Metall-pigmente" [Metallic pigments].

Aluminum bronzes or aluminum flake pigments are used in particular. Use is made both of untreated types, which are available commercially, for example, under the name Stapa® Metallux (from Eckart), and of treated types, especially silanized types, which are described, for example, in WO 01/81483 and are available commercially, for example, under the name Hydrolan® (from Eckart).

The metal flake pigment preferably has an average particle size (D50) of 10 to 70 and more particularly of 13 to 35 micrometers (ISO 13320-1 by Cilas (instrument 1064)). Such metal flake pigments preferably have a thickness of 200 to 2000 nm and more particularly 500 to 1500 nm (measured by scanning electron microscope). The two analysis methods provide sufficient determination of the geometric parameters of the particles, with the average particle size measurement tending to reflect the diameter of the flakes.

Suitable organic and/or inorganic color pigments are the pigments that are typically employed in the paint industry.

Examples of suitable inorganic color pigments are white pigments such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases, or chromium orange; or yellow iron oxide, nickel titanium yellow, chromium titanium yellow, cadmium sulfide, cadmium zinc sulfide, chromium yellow, or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black.

For further details refer to Römpp Lexikon Lacke and Druckfarben, Georg Thieme Verlag, 1998, pages 180 and 181, entry headings "Eisenblau-Pigmente" [Iron blue pigments] to "Eisenoxidschwarz" [Black iron oxide], pages 451 to 453, entry headings "Pigmente" [Pigments] to "Pigment-volumenkonzentration" [Pigment volume concentration], page 563, entry heading "Thioindigo-Pigmente" [Thioindigo pigments], page 567, entry heading "Titandioxid-Pigmente" [Titanium dioxide pigments], pages 400 and 467, entry heading "Natürlich vorkommende Pigmente" [Naturally occurring pigments], page 459, entry heading "Polycyclische Pigmente" [Polycyclic pigments], page 52, entry headings "Azomethinpigmente" [Azomethine pigments], and "Azopigmente" [Azo pigments], and page 379, entry heading "Metallkomplex-Pigmente" [Metal complex pigments].

The amount of the pigments may vary very widely and is guided primarily by the depth of the color and/or the intensity of the effect that are to be established, and also by the dispersibility of the pigments in the pigmented coating compositions of the invention. The fraction of pigments is preferably 0.5% to 50% by weight, with more particular preference 0.5% to 40% by weight, very preferably 1% to 30% by weight, particularly advantageously 2% to 20% by weight, based in each case on the total weight of the coating composition.

Organic Solvent (C)

As a solvent-based coating composition, the coating composition of the invention comprises at least one organic solvent (C).

Suitable solvents are all of the solvents that are typically used in the paint industry, examples being alcohols, glycol ethers, esters, ether esters, and ketones, aliphatic and/or aromatic hydrocarbons, such as, for example, acetone, methyl isobutyl ketone, methyl ethyl ketone, butyl acetate, 3-butoxy-2-propanol, ethyl ethoxypropionate, butyl glycol, butyl glycol acetate, butanol, dipropylene glycol methyl ether, butyl glycolate, xylene, toluene, Shellsol® T, Pine Oil 90/95, Solventnaphtha®, Shellsol® A, Solvesso, benzine 135/180.

The amount of organic solvents in the coating composition of the invention is for example not more than 65% by weight. The fraction is preferably 40% to 65% by weight, more preferably at least 45% by weight, more particularly at least 50% by weight, with more particular advantage at least 55% by weight, based in each case on the total amount of the pigmented coating composition of the invention. Particularly preferred ranges are from 40% to 62% by weight, more particularly 45% to 62% by weight, very preferably 50% to 62% by weight, and especially advantageously 55% to 62% by weight, based in each case on the total amount of the pigmented coating composition of the invention. The preferred ranges, especially the upper limits, can be recognized by the fact that the coating composition of the invention preferably comprises comparatively low fractions of organic solvents and thus has a comparatively low VOC.

The coating composition of the invention, moreover, is solvent-based. Solvent-based coating compositions are compositions whose solvents comprise organic solvents. This means that, during the preparation of the coating composition, water is not added explicitly, but instead water is included, for example, only as a residual fraction or contaminant from other constituents present in the coating composition, as a result, for example, of residual water fractions in organic solvents. More particularly, solvent-based means that the water fraction is less than 2% by weight, preferably less than 1% by weight, based in each case on the total weight of the coating composition. With very particular preference the coating composition is water-free.

Organosiloxane (D)

The coating composition of the invention comprises at least one special organosiloxane of the formula (I):

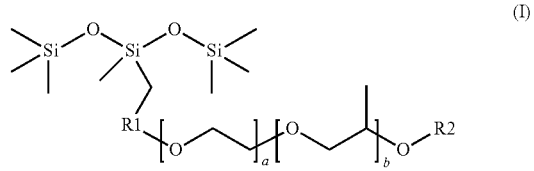

where $R_1=C_nH_{2n}$ with n=1 to 3, preferably 2; $R_2=H$ or $C_mH_{2m+1}$ with m=1 to 4, preferably H or $CH_3$, more preferably H; a=0 to 20, preferably 2 to 18, more preferably 5 to 15, and very preferably 8 to 12; b=0 to 20, preferably 0 to 10, more preferably 0 to 5, and very preferably 0; and a+b=2 to 40, preferably 4 to 20, more preferably 6 to 16, and very preferably 8 to 12. The ratio b/a is preferably between 0 and 0.5, especially preferably between 0 and 0.25, and very preferably 0. The stated preferred groups and ranges should each be understood as being preferable per se and not only in combination with other preferred groups and/or ranges. The details concerning the number and sequence of the ethylene oxide units and propylene oxide units in formula (I) have been selected for ease of comprehension and should of course be understood to mean that the units may be distributed randomly—in other words, in particular, there do not have to be any individual blocks of ethylene oxide units and propylene oxide units present.

Through the use of the at least one organosiloxane and through combination thereof with the melamine resin, the outstanding performance properties described are achieved—in particular, a balance between effective sheet bonding and appearance, and a low VOC in the coating composition of the invention.

From the range indications above it follows that the use of organosiloxanes which in the polyether chain contain primarily ethylene oxide units and only a few propylene units, or none at all, is preferred. Although the use of propylene oxide units is possible in principle and may be appropriate in individual cases, a particular surprise was that, through the use of those organosiloxanes which contain primarily ethylene oxide units in the polyether chain or in which the polyether chain consists of ethylene oxide units, it was possible to obtain the stated properties in a solvent-based coating composition. In spite of the hydrophilicity then present, these organosiloxanes exhibit outstanding suitability for use in the solvent-based coating compositions. For a polysiloxane (D) which is especially preferred in this sense, $R_1=C_2H_4$; $R_2=H$; a=5 to 15; and b=0, and even more preferably a=8 to 12.

Organosiloxanes of the formula (I) may be prepared by methods known to the skilled person. Such methods are described, for example, in patent applications U.S. Pat. No. 3,989,688, U.S. Pat. No. 4,431,789, or U.S. Pat. No. 3,505,377, which relate to organosiloxanes having similar or matching structural features. The organosiloxanes are available as commercial products, under the trade names CoatOSil® and Silwet® (from Momentive), for example.

The amount of special organosiloxanes in the coating composition of the invention is preferably 0.01% to 3% by weight, with more particular preference 0.02% to 2% by weight, very preferably 0.03% to 1.5% by weight, and, in one particular embodiment, 0.05% to 1% by weight.

Further Constituents

As well as the at least one melamine resin (A), the coating composition of the invention preferably comprises at least one further polymer (E) as binder.

Examples of suitable further binders are random, alternating and/or block, linear and/or branched and/or comb (co)polymers of ethylenically unsaturated monomers, or polyaddition resins and/or polycondensation resins. Regarding these terms, supplementary reference is made to Römpp Lexikon Lacke and Druckfarben, Georg Thieme Verlag, Stuttgart, New York, 1998, page 457, "Polyaddition" and "Polyadditionsharze (Polyaddukte)" [Polyaddition resins (polyadducts)], and also pages 463 and 464, "Polykondensate" [Polycondensates], "Polykondensation" [Polycondensation], and "Polykondensationsharze" [Polycondensation resins], and also pages 73 and 74, "Bindemittel" [Binders].

Examples of suitable (co)polymers are (meth)acrylate (co)polymers or partially hydrolyzed polyvinyl esters, more particularly (meth)acrylate copolymers.

Examples of suitable polyaddition resins and/or polycondensation resins are polyesters, alkyds, polyurethanes, polylactones, polycarbonates, polyethers, epoxy resin-amine adducts, polyureas, polyamides, polyimides, polyester-polyurethanes, polyether-polyurethanes, or polyester-polyether-polyurethanes.

The coating composition preferably comprises a hydroxy-functional polymer (E) as binder.

The pigmented coating composition of the invention preferably comprises at least one acrylate polymer, polyurethane polymer and/or a polyester as further binder (E). With very particular preference there is a polyester (E) present.

The polymers (E) as binders preferably contain thio, hydroxyl, N-methylamino-N-alkoxymethylamino, imino, carbamate, allophanate and/or carboxyl groups, preferably hydroxyl or carboxyl groups. Hydroxyl groups are especially preferred. Via these functional groups, more particularly the hydroxyl groups, it is then possible, for example, for crosslinking to take place with components which contain other functional groups such as, preferably, anhydride, carboxyl, epoxy, blocked isocyanate, urethane, methylol, methylol ether, siloxane, carbonate, amino, hydroxyl and/or beta-hydroxyalkylamide groups.

The coating composition of the invention is therefore preferably curable thermally, which means that by chemical reaction of the reactive functional groups described it is possible for crosslinking to take place (formation of a coating film), with the energetic activation of this chemical reaction being possible by thermal energy. With very particular preference there is crosslinking of the at least one melamine resin (A) with hydroxyl groups of the binder (E); in other words, the coating composition of the invention is then thermally curable and externally crosslinking.

External crosslinking is present, then, when a polymer containing certain functional groups reacts with a different agent, possibly likewise polymeric, which is called a crosslinking agent, the crosslinking agent then containing reactive functional groups which are complementary to the reactive functional groups present in the organic polymer employed. In this respect, accordingly, the melamine resin (A), for example, may be termed the crosslinking agent, and crosslinks with the hydroxyl-functional polymer (E) via methylol groups and/or methylol ether groups.

As will be appreciated, it is also possible for further components to be present, these components being generally identified by the skilled person as crosslinking agents. Examples include free and blocked polyisocyanates. These may then also crosslink, for example, with the melamine resins and/or with the hydroxy-functional polymers (E).

This of course does not rule out the coating composition also, proportionally, being self-crosslinking—this means that the complementary reactive functional groups are already present in a single polymer used as binder. Such proportional self-crosslinking occurs also in particular in the case of components which contain methylol groups, methylol ether groups and/or N-alkoxymethylamino groups in other words, for example, in the case of the melamine resins (A).

Further curing mechanisms as well, as for example a proportional physical curing (that is, the curing of a layer of a coating composition by filming as a result of loss of solvent from the coating composition, with linking within the coating or looping of the polymer molecules of the binders), are of course not ruled out.

It is, however, preferred for the coating composition to be in any case externally crosslinking, through use of a hydroxy-functional polymer (E) as binder, more particularly a polyester (E), as well as the melamine resin (A).

The functionality of the polymers (E) in respect of the above-described reactive functional groups may vary very widely and is guided in particular by the crosslinking density that is to be obtained, and/or by the functionality of the crosslinking agents employed in each case. In the case of the preferred hydroxyl-functional binders (E), for example, more particularly in the case of the preferred hydroxy-functional acrylate polymers, polyurethane polymers and/or polyesters, very preferably polyesters, the OH number is preferably 15 to 300, more preferably 30 to 250, very preferably 40 to 200, especially preferably 50 to 150 and more particularly 55 to 140 mg KOH/g in accordance with DIN 53240.

The above-described complementary functional groups can be incorporated into the binders in accordance with the customary and known methods of polymer chemistry. This can be done, for example, through the incorporation of monomers which carry corresponding reactive functional groups, and/or by means of polymer-analogous reactions.

Suitable binders (E), more particularly the acrylate polymers, polyurethane polymers and/or polyesters, very preferably the polyesters, have, for example, a number-average molecular weight of 500 to 10 000 g/mol, which may also, however, be lower or higher, more particularly higher. The weight-average molecular weight is situated for example in the range from 2000 to 20 000 g/mol. The molecular weight is determined by means of GPC analysis with THF (+0.1% of acetic acid) as eluent (1 ml/min) on a styrene-divinyl-benzene column combination. Calibration is carried out using polystyrene standards.

Likewise included may be an acrylate polymer (E). Acrylate polymers are also referred to, as is known, as (meth) acrylate (co)polymers, with the expression (meth)acrylate making it clear that the polymers include acrylate and/or methacrylate monomers or consist of such monomers.

Suitable acrylate polymers can be prepared by the methods known to the skilled person, using the olefinically unsaturated monomers that are known in this context and that have reactive functional groups (more particularly hydroxyl groups), generally in combination with monomers without reactive functional groups.

Examples of suitable olefinically unsaturated monomers containing reactive functional groups are as follows:
a) Monomers which carry at least one hydroxyl, amino, alkoxymethylamino, carbamate, allophanate, or imino group per molecule, such as
hydroxyalkyl esters of acrylic acid, methacrylic acid or another alpha,beta-olefinically unsaturated carboxylic acid that derive from an alkylene glycol which is esterified with the acid, or that are obtainable by reacting the alpha,beta-olefinically unsaturated carboxylic acid with an alkylene oxide such as ethylene oxide or propylene oxide, especially hydroxyalkyl esters of acrylic acid, methacrylic acid, ethacrylic acid, crotonic acid, maleic acid, fumaric acid or itaconic acid, in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate, or itaconate; or hydroxycycloalkyl esters such as 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate, or monoitaconate; reaction products of cyclic esters, such as, for example, epsilon-caprolactone, and its hydroxyalkyl or cycloalkyl esters;
olefinically unsaturated alcohols such as allyl alcohol;
polyols such as trimethylolpropane monoallyl or diallyl ether or pentaerythritol monoallyl, diallyl, or triallyl ether;
reaction products of acrylic acid and/or methacrylic acid with the glycidyl ester of an alpha-branched monocarboxylic acid having 5 to 18 carbon atoms per molecule, more particularly of a Versatic® acid, or, instead of the reaction product, an equivalent amount of acrylic and/or methacrylic acid, which is then reacted, during or after the polymerization reaction, with the glycidyl ester of an alpha-branched monocarboxylic acid having 5 to 18 carbon atoms per molecule, more particularly of a Versatic® acid;
aminoethyl acrylate, aminoethyl methacrylate, allylamine or N-methyliminoethyl acrylate;
N,N-di(methoxymethyl)aminoethyl acrylate or methacrylate or N,N-di(butoxymethyl)aminopropyl acrylate or methacrylate;
(meth)acrylamides, such as (meth)acrylamide, N-methyl-, N-methylol-, N,N-dimethylol-, N-methoxymethyl-, N,N-di(methoxymethyl)-, N-ethoxymethyl- and/or N,N-di(ethoxyethyl)-(meth)acrylamide;
acryloyloxy- or methacryloyloxyethyl, -propyl or -butyl carbamate or allophanate; further examples of suitable monomers containing carbamate groups are described in patent publications U.S. Pat. No. 3,479,328, U.S. Pat. No. 3,674,838, U.S. Pat. No. 4,126,747, U.S. Pat. No. 4,279,833, or U.S. Pat. No. 4,340,497.
b) Monomers which carry at least one acid group per molecule, such as acrylic acid, beta-carboxyethyl acrylate, methacrylic acid, ethacrylic acid, crotonic acid, maleic acid, fumaric acid, or itaconic acid;

olefinically unsaturated sulfonic or phosphonic acids or their partial esters;

mono(meth)acryloyloxyethyl maleate, succinate, or phthalate; or vinylbenzoic acid (all isomers), alpha-methylvinylbenzoic acid (all isomers), or vinylbenzenesulfonic acid (all isomers).

c) Monomers containing epoxide groups, such as the glycidyl ester of acrylic acid, methacrylic acid, ethacrylic acid, crotonic acid, maleic acid, fumaric acid, or itaconic acid, or allyl glycidyl ether.

Monomers of the above-described kind that are of relatively high functionality generally are not used or are only used in minor amounts. For the purposes of the present invention, minor amounts of monomers of relatively high functionality mean those amounts which do not lead to crosslinking or gelling of the copolymers, particularly of the (meth)acrylate copolymers.

Examples of suitable olefinically unsaturated monomers without reactive functional groups include alkyl esters of acrylic acid, methacrylic acid or another alpha,beta-olefinically unsaturated carboxylic acid, vinylaromatic compounds, and mixtures of these monomers.

The polyurethane polymers that can likewise be used as polymers (E) are obtained, for example, in a manner known to the skilled person by reacting at least one polyol selected from the group consisting of polyester polyols and polyether polyols, preferably having a number-average molecular weight of 10 000 to 20 000 g/mol, and at least one polyisocyanate, and also optionally, at least one compound containing at least one isocyanate-reactive functional group and at least one (potentially) anionic group in the molecule, optionally, at least one further compound containing at least one isocyanate-reactive functional group, and optionally, at least one compound with a number-average molecular weight of 60 to 600 g/mol, containing hydroxyl and/or amino groups in the molecule.

Polyurethane polymers of this kind are described for example in European patent applications EP 228003 and EP 574417.

Polyurethane polymers of this kind are obtained for example by using, as the isocyanate component, isocyanates that are typically employed in the paint industry sector, such as, for example, hexamethylene diisocyanate, octamethylene diisocyanate, decamethylene diisocyanate, dodecamethylene diisocyanate, tetradecamethylene diisocyanate, trimethylhexane diisocyanate, tetramethylhexane diisocyanate, isophorone diisocyanate, 2-isocyanatopropylcyclohexyl isocyanate, dicyclohexylmethane 2,4'-diisocyanate, dicyclohexylmethane 4,4'-diisocyanate, 1,4- or 1,3-bis(isocyanatomethyl)cyclohexane, 1,4- or 1,3- or 1,2-diisocyanatocyclohexane, 2,4- or 2,6-diisocyanato-1-methylcyclohexane, diisocyanates derived from dimer fatty acids, as sold under the trade name DDI 1410 by Henkel, 1,8-diisocyanato-4-isocyanatomethyloctane, 1,7-diisocyanato-4-isocyanatomethylheptane or 1-isocyanato-2-(3-isocyanatopropyl)cyclohexane, or tetramethylxylylene diisocyanates (TMXDI) or mixtures of these polyisocyanates, preferably tetramethylxylylene diisocyanate (TMXDI) and/or isophorone diisocyanate, preferably isophorone diisocyanate.

As chain extenders with hydroxyl and/or amino groups it is preferred to use trimethylolpropane and diethanolamine.

Likewise suitable as polyurethane resins (E) are those known as acrylated polyurethane resins, which are obtainable in a manner known to the skilled person by polymerizing ethylenically unsaturated monomers in the presence of a polyurethane resin. In this case it is possible to use polyurethane resins without double bonds and/or polyurethane resins with double bonds.

As binders it is also possible to use acrylated polyurethane resins having pendant and/or terminal double bonds, especially those with pendant and/or terminal ethenylarylene groups.

The acrylated polyurethane resins with pendant and/or terminal double bonds may be obtained by reacting a polyurethane prepolymer which contains at least one free isocyanate group with a compound which has at least one ethylenically unsaturated double bond and one NCO-reactive group, more particularly a hydroxyl group or an amino group.

The acrylated polyurethane resins with pendant and/or terminal double bonds may also be obtained by reacting a polyurethane prepolymer which contains at least one NCO-reactive group, more particularly at least one hydroxyl group or one amino group, with a compound which has at least one ethylenically unsaturated double bond and one free isocyanate group.

Also useful as binder polymers (E) are graft copolymers which are obtainable by polymerizing olefinically unsaturated monomers in the presence of the acrylated polyurethane resins with pendant and/or terminal double bonds.

Use is made in particular of graft copolymers which comprise a hydrophobic core of at least one copolymerized olefinically unsaturated monomer and a hydrophilic shell of at least one hydrophilic acrylated polyurethane. Also suitable, however, are graft copolymers which comprise a hydrophobic core of at least one hydrophobic acrylated polyurethane and a hydrophilic shell of at least one copolymerized olefinically unsaturated monomer.

Suitable acrylated polyurethane resins and also graft copolymers prepared from them are described in, for example, WO 01/25307, page 5 line 14 to page 45 line 4, and EP-B-787 159, page 2 line 27 to page 7 line 13.

The polyesters likewise suitable as polymers (E) and preferred in the context of the present invention may be saturated or unsaturated, more particularly saturated. Polyesters of this kind and their preparation, and also the components which can be used for this preparation, are known to the skilled person and are described in EP-B-787 159, for example.

The polymers in question are more particularly polymers prepared using polyhydric organic polyols and polybasic organocarboxylic acids. These polyols and polycarboxylic acids are linked with one another by esterification, in other words by means of condensation reactions. Correspondingly, the polyesters are generally assigned to the group of the polycondensation resins. Depending on type, functionality and proportions used, and ratios of the starting components, linear or branched products, for example, are obtained. Whereas linear products are formed principally when using difunctional starting components (diols, dicarboxylic acids), the use of alcohols of relatively high functionality, for example, (with an OH functionality, this being the number of OH groups per molecule, of more than 2) produces branching. It is of course also possible to make proportional use of monofunctional components during the preparation, such as monocarboxylic acids, for example. For the preparation of polyesters it is also possible, as is known, instead of or as well as the corresponding organic carboxylic acids, to use the anhydrides of the carboxylic acids, more particularly the anhydrides of the dicarboxylic acids. Likewise possible is preparation through the use of hydroxycarboxylic acids or the lactones that are derived from the hydroxycarboxylic acids by intramolecular esterification.

Suitable diols are, for example, glycols, such as ethylene glycol, propylene glycol, butylene glycol, butane-1,4-diol, hexane-1,6-diol, neopentyl glycol, and other diols, such as 1,4-dimethylolcyclohexane or 2-butyl-2-ethyl-1,3-propanediol.

Suitable alcohols of relatively high functionality (OH functionality more than 2) are, for example, trimethylolpropane, glycerol and pentaerythritol.

The acid component of a polyester generally comprises dicarboxylic acids or anhydrides thereof having 2 to 44, preferably 4 to 36, carbon atoms in the molecule. Suitable acids are, for example, o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptane-dicarboxylic acid, tetrachlorophthalic acid and/or dimerized fatty acids. Instead of these acids it is also possible to use their anhydrides, where they exist. It is additionally possible to use carboxylic acids of relatively high functionality, having 3 or more carboxyl groups (and/or the corresponding anhydrides), an example being trimellitic anhydride. Use is frequently also made, proportionally, of monocarboxylic acids, such as unsaturated fatty acids, for example.

Hydroxycarboxylic acids which can be used are, for example, hydroxycaproic acid, hydroxybutyric acid, hydroxydecanoic acid and/or 12-hydroxystearic acid. Lactones which can be used are, for example, the beta-, gamma-, delta- and epsilon-lactones that are known per se, more particularly epsilon-caprolactone.

As well as the monomeric compounds described above it is also possible for example to use starting products that are already in polymeric form, for example, as diols, the polyester diols which are known per se and are obtained by reacting a lactone with a dihydric alcohol.

The above-described preferred polymers (E) as binders, in other words the acrylate polymers, polyurethane polymers and/or polyesters, can be used per se or else in combination with one another in the coating composition of the invention.

Besides the acrylate polymers, polyurethane polymers and/or polyesters (E) it is also possible to use further polymers as binders. Corresponding binders that are customarily used in the automotive industry segment in pigmented paints, more particularly basecoat materials, are known to the skilled person and can be easily selected by said person.

As an example, partially hydrolyzed polyvinyl esters are cited as further random, alternating and/or block, linear and/or branched and/or comb (co)polymers of ethylenically unsaturated monomers. Examples of further polyaddition resins and polycondensation resins are alkyds, polylactones, polycarbonates, polyethers, epoxy resin-amine adducts, polyureas, polyamides, or polyimides.

The amount of further binders (E), more particularly acrylate polymers, polyurethane polymers and/or polyesters, very preferably polyesters, is preferably 6% to 30% by weight, with more particular preference 8% to 25% by weight, very preferably 10% to 20% by weight, and, in one particular embodiment, 12% to 18% by weight, based in each case on the total amount of the coating composition of the invention.

In the coating compositions of the invention it is also possible, advantageously, to use polymer microparticles (M). Suitable polymer microparticles are described in, for example, EP-A-480 959, page 3 line 36 to page 4 line 35, WO 96/24619, WO 99/42529, EP-B-1 173 491, EP-B-1 185 568, WO 03/089487, WO 03/089477, WO 01/72909 and WO 99/42531. The polymer microparticles may be used in particular to control the leveling, the evaporation behavior, and the attitude toward incipient dissolution by the clearcoat material.

Suitable polymer microparticles typically have a number-average molecular weight of 2000 to 100 000 g/mol. The molecular weight is determined by means of GPC analysis with THF (+0.1% of acetic acid) as eluent (1 ml/min) on a styrene-divinylbenzene column combination. Calibration is carried out with polystyrene standards.

Suitable polymer microparticles also typically have an average particle size of 0.01 to 10 μm, in particular of 0.01 to 5 μm, and very preferably of 0.02 to 2 μm, in accordance with ISO 13320-1.

Polymer microparticles used with particular preference contain reactive functional groups which are able to react with the functional groups of the crosslinking agent. In particular the polymer microparticles contain hydroxyl groups. In this case the polymer microparticles preferably have a hydroxyl number of 5 to 150 mg KOH/g in accordance with DIN 53240. Hydroxyl-containing polymer microparticles are described in WO 01/72909, for example.

Crosslinked polymer microparticles are obtainable by, for example, subjecting a mixture of:
  (a) an ethylenically unsaturated monomer which contains one ethylenically unsaturated group per molecule, or a mixture of such monomers, and
  (b) an ethylenically unsaturated monomer which contains at least two ethylenically unsaturated groups per molecule, or a mixture of such monomers, to polymerization in an aqueous phase in the presence, optionally, of emulsifiers or in the presence, optionally, of a carrier resin, preferably a polyester, and then transferring the aqueous polymer microparticle dispersion obtained in this way into an organic solvent or a mixture of organic solvents.

Preference is given to polymer microparticles which have been prepared using components containing ionic and/or polar groups, preferably hydroxyl groups and/or carboxyl groups. The components (a) and (b) ought in general to contain between 1% and 20% by weight, preferably between 3% and 15% by weight, of ionic and/or polar groups.

In order to obtain sufficiently crosslinked polymer microparticles it is generally sufficient to use 0.25 to 1.2 mol, preferably 0.3 to 1 mol, of component (b) per mole of component (a).

Alternatively the polymer microparticles (M) used in the coating compositions may be prepared directly in organic phase.

Polymer microparticles used with preference are obtainable, for example, by subjecting a mixture of:
  (c) an ethylenically unsaturated monomer (M1) which contains at least one reactive group (G1) per molecule, or a mixture of such monomers (M1), and
  (d) optionally, an ethylenically unsaturated monomer (M2) which contains at least one non-(G1) reactive group (G2) per molecule, or a mixture of such monomers (M2), and (e) optionally, a further ethylenically unsaturated monomer (M3) or a mixture of such monomers (M3)

to polymerization in an organic solvent in the presence, optionally, of a carrier resin, preferably a polyester.

Examples of suitable monomers (M1) are monomers which contain hydroxyl groups, carbamate groups, amino groups, alkoxymethylamino groups, allophanate groups or imino groups, especially hydroxyl groups, as reactive groups.

The monomers (M1) with the reactive groups (G1) here may also be prepared by reacting two compounds of which a first compound contains a reactive group and at least one ethylenically unsaturated double bond, and the other compound contains a group reactive with the reactive groups of the first compound, and optionally an ethylenically unsaturated double bond.

Examples of suitable monomers (M2) are monomers which contain carboxyl groups.

Suitable monomers (M3) are the so-called neutral monomers that are typically employed, i.e., ethylenically unsaturated monomers which contain no reactive groups.

It follows from the above that the polymeric microparticles also include polymers which may likewise contribute to film formation, in particular by external crosslinking with the melamine resins. These are, accordingly, likewise binder components. However, on account of their particulate character present in any event, in particular the particle sizes measurable as described above, they are considered separately from the binders (E) for the purposes of the present invention. This, of course, does not rule out the possibility of the binders (E) as well forming aggregated particles and/or microparticles in certain solvents.

The polymer microparticles (M) may be used in the coating compositions of the invention for example in an amount of 3% to 30% by weight, more particularly of 4% to 20% by weight, based in each case on the total weight of the basecoat material.

Besides the above-described components, the coating composition of the invention may comprise customary and known auxiliaries and additives in typical amounts, preferably 0.5% to 40% by weight and more preferably 0.5% to 30% by weight, more particularly 0.5% to 15% by weight, based in each case on the total weight of the respective coating composition.

Examples of suitable auxiliaries and additives are organic and inorganic fillers, examples being talc or fumed silicas, and/or further customary auxiliaries and additives, such as, for example, antioxidants, deaerating agents, wetting agents, catalysts, dispersants, emulsifiers, rheological assistants such as flow control agents, thickeners, antisag agents, and thixotropic agents, waxes, slip additives, reactive diluents, free-flow aids, siccatives, biocides, additives for enhancing substrate wetting, additives for enhancing surface smoothness, matting agents, radical scavengers, light stabilizers, preferably the above-described UV absorbers with an absorption maximum below 370 nm and/or HALS, corrosion inhibitors, flame retardants, or polymerization inhibitors, as are described in the book "Lackadditive" [Additives for Coatings] by Johan Bieleman, Wiley-VCH, Weinheim, N.Y., 1998, in detail. Preferred auxiliaries and additives are rheological assistants, deaerating agents, wetting agents, dispersants, UV absorbers, and radical scavengers. Particularly preferred auxiliaries and additives are UV absorbers and wetting agents, and also fillers, among which fumed silicas are preferred.

The solids content of the coating composition is at least 35%, preferably 35% to 60%, more preferably up to 55%, more particularly up to 50%, and with particular advantage up to 45%. Particularly preferred ranges are from 38% to 60%, more particularly 38% to 55%, very preferably 38% to 50%, and especially advantageously 38% to 45%.

Unless otherwise indicated, the solids content for the purposes of the present invention is determined in accordance with DIN ISO 3251 with an initial sample mass of 1.0 g—for example, 1.0 g of the coating composition of the invention—over a test duration of 60 minutes and at a temperature of 125° C.

This test method is likewise employed in order, for example, to determine the fraction of different components of the coating composition as a proportion of the overall composition. Thus, for example, the solids of a binder dispersion of a polymer (E) which is added to the coating composition may be determined correspondingly, in order to ascertain the proportion of this polymer (E) in the overall constitution.

Under the stated conditions, in other words at the stated solids contents, preferred pigmented coating compositions of the invention have a viscosity at 23° C. of 16 s to 35 s and more preferably 20 to 28 s flow time in the Ford 3 Cup. For the purposes of the present invention, a viscosity within this range is referred to as spray viscosity (processing viscosity). As is known, coating compositions are applied at spray viscosity—that is, under the conditions then present, they possess a viscosity which in particular is not too high, in order to enable effective application. This means that the setting of the spray viscosity is important in order to be able to apply a paint at all by spraying techniques, and in order to ensure that a complete, uniform coating film is able to form on the substrate to be coated. A particular advantage is that the coating material of the invention at spray viscosity possesses a high solids content, so there is no need for further dilution with environmentally harmful organic solvents. The preferred ranges for the solids content, more particularly the lower limits, can be ascertained, therefore, from the fact that in the application-ready state, the coating composition of the invention preferably has comparatively high solids contents (high-solids systems) and therefore a comparatively low VOC.

Further Coating Compositions for Producing the Multicoat Paint System of the Invention Clearcoat As indicated above, the multicoat paint system of the invention is produced by using the coating composition of the invention as basecoat and then applying a clearcoat material to the basecoat film, preferably to the as yet uncured basecoat film (wet-on-wet). In this way, then, the multicoat paint system of the invention is obtained, comprising at least one basecoat and at least one clearcoat. There is preferably precisely one of each coat.

Examples of suitable clearcoat materials for producing the clearcoat of the multicoat paint system of the invention are transparent coating compositions that are typically employed and that comprise melamine resins. Suitable by way of example are clearcoat materials which possess a melamine resin fraction of less than 20% by weight, based on the solids content of the transparent coating composition. These are aqueous or solvent-containing transparent coating compositions, which may be formulated either as one-component compositions or else as two-component or multicomponent coating compositions. Also suitable, furthermore, are powder slurry clearcoats. Solvent-based clearcoats are preferred, in other words those which comprise at least one organic solvent (regarding the definition of "solvent-based", see above).

Suitable transparent coating compositions are described in WO 03/050194 A1, in U.S. 2008/076868 A1, and in WO 06/063304 A1, for example. Preference is given to using transparent coating compositions containing carbamate groups—that is, clearcoat materials which comprise carbamate-functional polymers as binders.

The transparent coating compositions (clearcoats) preferably have a solids content of at least 45%, preferably at least 47%, at spray viscosity, and are solvent-based (regarding the definition of spray viscosity and solids content, see above). Preferred ranges of the solids content are from 45% to 60%, preferably 47% to 58%.

The transparent coating compositions used may be curable thermally and/or by means of radiation, such as more particularly by means of UV radiation.

The transparent coating compositions customarily comprise at least one binder having functional groups and also at least one crosslinker having functionality complementary to the functional groups of the binder. Examples of such complementary functionalities are, for example, the following duos (a/b) in each case complementary to one another: (carboxyl/epoxy), (amine or thiol or hydroxyl/blocked or free isocyanate or alkoxylated amino groups or transesterifiable groups), ((meth)acryloyl/CH-acidic or amine or hydroxyl or thiol), (carbamate/alkoxylated amino groups), and ((meth)acryloyl/(meth)acryloyl).

Preference is given to using solvent-containing transparent coating compositions based on polyurethane resins and/or polyacrylate resins and/or polyester resins, preferably having hydroxyl, amino, carbamate, carboxyl, (meth)acryloyl and/or thiol groups in combination with the corresponding crosslinkers, more particularly in combination with isocyanates, aminoplast resins, and/or anhydrides. Such systems are therefore thermally curable and externally crosslinking.

Employed with particular preference are solvent-based one-component clearcoat materials with solids contents of at least 45%, preferably at least 47%, which are thermally curable and externally crosslinking. Used preferably in this context as binders are polyurethane resins and/or polyacrylate resins and/or polyesters, and these binders more particularly contain hydroxyl groups and/or carbamate groups. In combination with these binders use is preferably made of melamine resins as crosslinking agents, which, as already described above, have methylol groups and methylol ether groups more particularly.

Besides the binder and crosslinker, the clearcoat materials comprise customary auxliaries and additives, such as, for example, crosslinking catalysts, defoamers, adhesion promoters, additives for enhancing substrate wetting, additives for enhancing surface smoothness, matting agents, light stabilizers, preferably UV absorbers with an absorption maximum below 370 nm and/or HALS, corrosion inhibitors, biocides, flame retardants, or polymerization inhibitors, as described in detail in the book "Lackadditive" by Johan Bieleman, Wiley-VCH, Weinheim, N.Y., 1998, in detail.

In one specific embodiment the clearcoat material also contains the organosiloxane (D). The special organosiloxanes content of the clearcoat material is preferably 0.01% to 4% by weight, with more particular preference 0.05% to 3% by weight, and very preferably 0.1% to 2.5% by weight. A particular advantage of the present invention, however, is that there is no need to use the organosiloxane in the clearcoat. Although its use in the clearcoat may be appropriate in certain cases, an outstanding profile of properties in terms of appearance and sheet bonding adhesion is achieved even without such use.

The further coating compositions which can likewise be employed for producing the multicoat paint system of the invention, more particularly primers and surfacers, are the coating compositions known to the skilled person in this context, which generally are available commercially.

Production of the Multicoat Coating System of the Invention

To produce the multicoat coating system, a layer of adhesive, more particularly a layer of a moisture-curing, isocyanate-based adhesive, is applied to the multicoat paint system of the invention. As described above, the multicoat paint system of the invention possesses outstanding sheet bonding adhesion, meaning that the adhesive adheres very well to the multicoat paint system. The layer of adhesive is located directly on the clearcoat which forms the uppermost coat of the multicoat paint system. In the case of an applied layer of adhesive, therefore, there is in particular no intercoat of adhesion primer between the multicoat paint system and the layer of adhesive.

The layer of adhesive is produced by applying a moisture-curing, isocyanate-based adhesive directly—that is, without further intercoat—to the uppermost clearcoat film of the cured, cooled multicoat paint system. The moisture-curing, isocyanate-based adhesive may be applied by means of the customary and suitable methods, such as spraying, for example, and in the customary adhesive-layer thicknesses of 0.1 to 5 mm.

Suitable adhesives are described for example in the patent specification U.S. Pat. No. 5,852,137. More particularly suitable are the moisture-curing, isocyanate-based adhesives typically used for the bonding of windshields. Such adhesives may be obtained commercially, for example, under the "Betaseal®" designation from Dow Automotive. Moisture-curing, isocyanate-based adhesives (polyurethane adhesives) can be employed in general as one-component adhesives or else as two-component adhesives. Particular preference is given to using moisture-curing, isocyanate-based, one-component adhesives.

Following on from this, a glazing sheet can then be bonded to the multicoat coating system in other words, therefore, the use in accordance with the invention can take place.

By "bonding" is meant the long-term fixing of a glazing sheet on or to the substrate by means of the multicoat coating system of the invention.

Glazing sheets contemplated include all customary and known glazing sheets. The glazing sheet is preferably a windshield.

Step (3) of the use in accordance with the invention (application of a glazing sheet to the layer of adhesive, and subsequent curing of the adhesive) may be implemented as follows: The cleaned glazing sheet is applied to the freshly applied layer of adhesive, and is fixed and pressed on. The adhesive can be cured at room temperature when the atmospheric humidity is sufficient. Curing of the adhesive may take place, for example, at an atmospheric humidity of 50% relative humidity and at a temperature of 25° C. over 72 hours.

The invention is elucidated further, using examples, in the text below.

EXAMPLES

1. Preparation of the Inventive and Comparative Basecoat Materials

Inventive basecoat material 1 and comparative basecoat materials C-2 and C-3 were prepared as follows.

1.1 Preparation of a Polyester (E) as Binder

A 2 L four-neck flask with stirrer, electrical resistance heating, thermometer, packed column packed with Pall rings, equipped with overhead thermometer, distillation bridge, condenser, and receiver, is charged with 81.0 parts by weight of 1,6-hexanediol, 108.0 parts by weight of neopentyl glycol, 28.0 parts by weight of glycerol, 38.0 parts by weight of trimethylolpropane, 99.0 parts by weight of adipic acid, 157.0 parts by weight of phthalic anhydride, and 125.0 parts by weight of isophthalic acid. The reaction mixture is heated rapidly with stirring to 160° C. and held at 160° C. for 30 minutes. From 160° C., the temperature is raised to 190° C. over the course of 1.5 hours at a rate such that the column overhead temperature does not exceed 103° C. The batch is then cooled to 150° C. and 63.0 parts by weight of Cardura E 10 P and 7.0 parts by weight of xylene are added, followed by heating and by holding at 165° C. for an hour. The batch is then heated to 230° C. and held at 230° C. until the acid number falls below a level of 10 mg KOH/g (measured according to DIN EN ISO 2114:2002-06). The epoxy-modified polyester is cooled further and diluted with a mixture of 238.0 parts by weight of solvent naphtha 155/185, 24.0 parts by weight of 1-methoxypropyl acetate, and 35.0 parts by weight of ethyl ethoxypropionate. The result is a 65% strength binder solution (solids content). The resulting epoxy-modified polyester has an acid number of 8 mg KOH/g and an OH number of 102 mg KOH/g, in each case based on the solids. The weight-average molecular weight is 14 500 g/mol.

1.2 Preparation of Polymeric Microparticles

First of all a carrier resin is prepared: in a reactor, 5.762 parts by weight of xylene, 5.762 parts by weight of toluene, and 0.179 part by weight of methanesulfonic acid are introduced and heated to 104° C. Then 80.615 parts by weight of 12-hydroxystearic acid are run into the reactor and the batch is boiled at reflux at 171° C., with the water of reaction being removed. The reaction is over when an acid number of 35 is reached. After cooling, the solids is adjusted with solvent naphtha to 80 parts by weight.

Then the actual polymeric microparticles are prepared: In a reactor, 43.2 parts by weight of solvent naphtha, 0.08 part by weight of N,N-dimethylcocosamine, and 1.0 part by weight of ethyl acetate are introduced and heated to 104° C. The reactor is placed under a pressure of 0.69 bar and is charged over the course of 2 hours simultaneously with a monomer mixture consisting of 27.6 parts by weight of methyl methacrylate, 3.8 parts by weight of 2-hydroxypropyl methacrylate, 0.8 part by weight of glycidyl methacrylate, 12.8 parts by weight of the above-described carrier resin, 1.5 parts by weight of methacrylic acid, and 1.5 parts by weight of octyl mercaptan, and with an initiator mixture consisting of 2.3 parts by weight of tert-butyl peroxy-2-ethylhexanoate and 5.1 parts by weight of solvent naphtha. The batch is subsequently held for 3 hours at the above-mentioned temperature and pressure, after which it is cooled and adjusted with solvent naphtha to a solids of 41.0%.

To produce the inventive basecoat material 1 (B-1) and the comparative basecoat materials C-2 and C-3, the components listed in table 1 were mixed in the stated amounts (parts by weight) and the resulting mixture was homogenized. For the setting of the application viscosity (spray viscosity), a further addition was made of butyl acetate (5 parts by weight) in each case. Table 1 also shows the solids contents (SC), the pigment content (PC), the organic solvents content (OS), and the binder content (BC) of the components employed, and also the solids content and the viscosity of the resulting basecoat materials.

TABLE 1

Compositions and key data of basecoat materials 1, C-2 and C-3

| | SC | BC | OS | PC | C-2 | C-3 | B-1 |
|---|---|---|---|---|---|---|---|
| Polymeric microparticles (1.2) | 31 | 31 | 69 | 0 | 28.0 | 26.0 | 26.0 |
| Resimene 755 | 100 | 100 | 0 | 0 | 12.0 | 17.0 | 17.0 |
| Butyl acetate | 0 | 0 | 100 | 0 | 10.0 | 10.0 | 10.0 |
| Polyester (E) (1.1) | 65 | 65 | 35 | 0 | 25.0 | 22.0 | 22.0 |
| Catalyst | 33.3 | 0 | 66.7 | 0 | 1.0 | 1.0 | 1.0 |
| Butyl acetate | 0 | 0 | 100 | 0 | 10.0 | 10.0 | 10.0 |
| Aluminum pigment | 75 | 0 | 25 | 75 | 7.0 | 7.0 | 7.0 |
| Butyl acetate | 0 | 0 | 100 | 0 | 7.0 | 7.0 | 6.8 |
| Organosiloxane (D) | 100 | 100 | 0 | 0 | | | 0.2 |
| Sum total [%] | | | | | 100.0 | 100.0 | 100.0 |
| Solids [%] | | | | | 42.5 | 44.9 | 45.1 |
| Initial viscosity (Ford 3 Cup, 23° C.) | | | | | 31 | 31 | 31 |
| Addition of butyl acetate | | | | | 5 | 5 | 5 |
| Solids at application [%] | | | | | 39 | 39 | 39 |
| Application viscosity (Ford 3 Cup, 23° C.) | | | | | 26 | 26 | 26 |

Resimene 755: Melamine resin from Ineos
Catalyst: Nacure 5225 (King Industries)
Aluminum pigment: Metalux Alu (Eckart)
Organosiloxane (D): The product used was the commercial product Silwet L-7608 (Momentive)

All basecoat materials possess a solids content of 39% and have at 23° C. a viscosity of 26 s flow time in the Ford 3 Cup (spray viscosity). The proportion of the melamine resin in the paint at spray viscosity in C-2 is 11% by weight and in C-3 and B-1 is 16% by weight, based in each case on the overall composition.

2. Production of Comparative and Inventive Multicoat Paint Systems MC-1 to MC-4 and MI-1 and MI-2

Performance properties were tested by first producing multicoat paint systems, using basecoat materials B-1, C-2, and C-3, in a customary and known way, on test panels with dimensions of 30×20 cm.

To do this, cathodically electrocoated steel test panels were coated with a conventional commercial polyester-based gray surfacer from BASF Coatings AG, after which the resulting surfacer films were flashed off at 20° C. and a relative humidity of 65% for 5 minutes and baked in a forced-air oven at a substrate temperature of 165° C. for 5 minutes.

After the test panels had cooled to 20° C., basecoat materials B-1, C-2, and C-3 were applied by automated ESTA spray application, to give a dry film thickness, after the subsequent curing, of 17-19 micrometers. The basecoat films were subsequently flashed off for 5 minutes and coated in turn with a solvent-containing, optionally organosiloxane-modified (see below), high-solids 1-component clearcoat material from BASF Coatings GmbH, to give a dry film thickness, after the subsequent curing, of 37-39 micrometers. This was followed by a flash-off rest time of 5 minutes, after which the basecoat films and the clearcoat films applied over them were jointly baked at a substrate temperature of 140° C. for 10 minutes. This resulted in the comparative and inventive multicoat paint systems MC-1 to MC-4 (comparative) and MI-1 and MI-2 (inventive).

The clearcoat material used has a solids content of 48% at spray viscosity (26 s flow time in the Ford 3 Cup at 23° C.). This is a clearcoat material which comprises a carbamate-functional acrylate binder and a melamine resin (Resimene 747) crosslinking agent. As well as multicoat paint systems produced using the original BASF Coatings GmbH clearcoat (CC standard), multicoat paint systems were produced as well in which the clearcoat had been admixed or modified with 2% by weight of organosiloxane (D) (Silwet L-7608) (CC (D)).

Table 2 gives an overview of the basecoat and clearcoat materials used in producing the multicoat paint systems.

TABLE 2

Multicoat paint systems produced

| Experiment | MC-1 | MC-2 | MC-3 | MC-4 | MI-1 | MI-2 |
|---|---|---|---|---|---|---|
| Basecoat | C-2 | C-3 | C-2 | C-3 | B-1 | B-1 |
| Clearcoat | CC Standard | CC Standard | CC (D) | CC (D) | CC Standard | CC (D) |

3. Performance Investigation 3.1 Appearance

Investigated first of all was the overall appearance of the multicoat paint systems produced. The measurements were carried out using a "Wave Scan DOI" instrument (from Byk/Gardner). The parameter determined was the CF value, which is calculated using the stated instrument's measured values of LU (luster; evaluation of the gloss), SH (sharpness, evaluation of the distinctness of image), and OP (Orange Peel, evaluation of the leveling), and which therefore represents a measure of the overall optical quality or appearance of the coating (CF=0.50*OP+0.35*SH+0.15*LU). The higher the CF value, the more high-grade the appearance.

3.2 Sheet Bonding Adhesion

Additionally tested was the sheet bonding adhesion—this, then, is the quality of adhesive bonding between adhesive material and the multicoat paint system.

For this purpose, a moisture-curing, isocyanate-based adhesive (Betaseal® 1858-1, Dow Automotive) was applied in strip formation in longitudinal direction over the entire clearcoat film of each of the multicoat paint systems MC-1 to MC-4 and MI-1 and MI-2, after 24 hours of storage at room temperature (25° C.). The adhesive was cured at 50% atmospheric humidity and 25° C. for 72 hours. Following the curing of the adhesive, a Quick-Knife test is conducted. For this test the cured strip of adhesive composition is incised at one short side (that is, at one of the two ends of the strip) parallel to the substrate and within the layer of adhesive to a width of approximately 5 cm, thus forming an upper end, graspable with the hand, of cured adhesive material, and a lower layer of adhesive, approximately 5 cm long and correspondingly thinner, on the substrate. The graspable end is then pulled in the direction of the continuing strip of adhesive material, thereby successively extending the incision previously made within the layer of adhesive. At the same time as this pull removal, cuts with a knife are made about every 12 mm, perpendicular to the strip of adhesive material, into the correspondingly thinner layer of adhesive, down to the substrate (that is, down to the surface of the clearcoat film). The cuts are made in each case immediately in front of the position at which the part of the adhesive strip already removed meets the part of the still original adhesive strip.

If the layer of adhesive tears completely within the layer, in other words ideally along the initial cut parallel to the substrate, the sheet bonding adhesion is acceptable or very good. The reason is that in this case the sheet bonding adhesion, this being the adhesion between clearcoat film and adhesive, is greater than the adhesion forces (which are in any case sufficient) within the layer of adhesive. If, however, there is at least proportional delamination at the adhesive layer/clearcoat film interface, the bonding force at this interface is evidently reduced or inadequate.

Specific evaluation scale:

1: 0% tear area within the layer of adhesive (very poor sheet bonding)

2: about 25% tear area within the layer of adhesive (poor sheet bonding)

3: about 50% tear area within the layer of adhesive (still insufficient sheet bonding)

4: 75% tear area within the layer of adhesive (good sheet bonding)

5: 100% tear area within the layer of adhesive (very good sheet bonding)

Table 3 shows the results of appearance and sheet bonding adhesion for the various multicoat paint systems and multicoat coating systems.

TABLE 3

Results of the performance investigations

| Experiment | MC-1 | MC-2 | MC-3 | MC-4 | MI-1 | MI-2 |
|---|---|---|---|---|---|---|
| Basecoat | C-2 | C-3 | C-2 | C-3 | B-1 | B-1 |
| Clearcoat | CC Standard | CC Standard | CC (D) | CC (D) | CC Standard | CC (D) |
| Sheet bonding | 5 | 1 | 3 | 2 | 4 | 5 |
| Appearance | 50 | 55 | 49 | 54 | 56 | 54 |

The results show unambiguously that the systems according to the invention combine outstanding appearance with very good sheet bonding adhesion. In comparison to the standard systems it is found in particular that with the latter in each case one of the properties is unacceptable at the expense of the other property. Either a good, or at least not very poor, sheet bonding adhesion is achieved (low fraction of melamine resin in the basecoat material C-2) in unison with a poor appearance, or else a poor sheet bonding adhesion (high fraction of melamine resin in the basecoat material C-3) is obtained in unison with a good appearance. Surprisingly, through the use of the organosiloxane (D) in the basecoat material, an excellent balance is obtained between the stated properties. This is evident especially from the comparison of systems MC-2 with MI-1 and MC-4 with MI-2, the sole difference between them in each case being the addition of the organosiloxane to the basecoat material. Even more surprising was the fact that, as a result of the addition to the basecoat material, which is not in direct contact with the layer of adhesive, a substantially more advantageous effect can be achieved than by addition to the clearcoat material.

The invention claimed is:

1. A solvent-based, pigmented coating composition having a solids content of at least 35%, comprising (A) at least one melamine resin, (B) at least one pigment, (C) at least one organic solvent, and (D) at least one organosiloxane of the general formula (I)

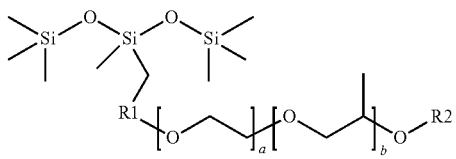

(I)

where $R_1=C_nH_{2n}$ with n=1 to 3; $R_2$=H or $C_mH_{2m+1}$ with m=1 to 4; a=0 to 20; b=0 to 20; and a+b=2 to 40.

2. The solvent-based, pigmented coating composition as claimed in claim 1, which comprises (E) at least one acrylate polymer, polyurethane polymer, and/or polyester as a binder.

3. The solvent-based, pigmented coating composition as claimed in claim 2, wherein the binder (E) has an OH number of 15 to 300 mg KOH/g.

4. The solvent-based, pigmented coating composition as claimed in claim 2, wherein at least one polyester is included as binder (E).

5. The solvent-based, pigmented coating composition as claimed in claim 1, wherein at least one aluminum flake pigment is included as pigment (B).

6. The solvent-based, pigmented coating composition as claimed in claim 1, wherein for the organosiloxane (D) $R_1=C_2H_4$; $R_2$=H or $CH_3$; a=2 to 18; b=0 to 10; and a+b=4 to 20.

7. The solvent-based, pigmented coating composition as claimed in claim 6, wherein for the organosiloxane (D) $R_1=C_2H_4$, $R_2$=H; a=5 to 15; and b=0.

8. A process for producing a multicoat paint system, in which
(a) at least one basecoat material is applied to a substrate,
(b) a polymer film is formed from the basecoat material applied in stage (a),
(c) at least one clearcoat material is applied to the resultant basecoat film, and subsequently
(d) the basecoat film is cured together with the clearcoat material applied in stage (c), which comprises using as the basecoat material a coating composition as claimed in claim 1, and with the topmost coat of the multicoat paint system being the clearcoat film.

9. The process as claimed in claim 8, wherein first at least one primer and then at least one surfacer are applied to the substrate before the basecoat material is applied.

10. The process as claimed in claim 8, wherein said clearcoat material used is a solvent-based clearcoat material having a solids content of at least 45%.

11. The process as claimed in claim 8, wherein the clearcoat material comprises at least one polyurethane resin and/or polyacrylate resin and/or polyester resin comprising hydroxyl groups and/or carbamate groups as binder and at least one melamine resin as crosslinking agent.

12. The process as claimed in claim 8, wherein said substrate used is a metallic substrate or a plastics substrate.

13. A multicoat paint system produced by a process as claimed in claim 8.

14. A process for producing a multicoat coating system, in which
(1) a multicoat paint system as claimed in claim 13 is produced and
(2) an adhesive is applied directly to the topmost clearcoat film of the multicoat paint system, forming a layer of adhesive.

15. A multicoat coating system produced by the process as claimed in claim 14.

16. A method for adhesively bonding a glazing sheet on a substrate coated with a multicoat coating system, wherein
(1) a multicoat paint system as claimed in claim 13 is produced,
(2) an adhesive is applied directly to the topmost clearcoat film of the multicoat paint system, forming a layer of adhesive on the multicoat paint system,
and
(3) a glazing sheet is applied to the layer of adhesive and then the adhesive is cured.

* * * * *